July 15, 1958
R. B. WYSOR
2,843,228
BRAKE APPLYING SYSTEMS
Filed Jan. 11, 1956
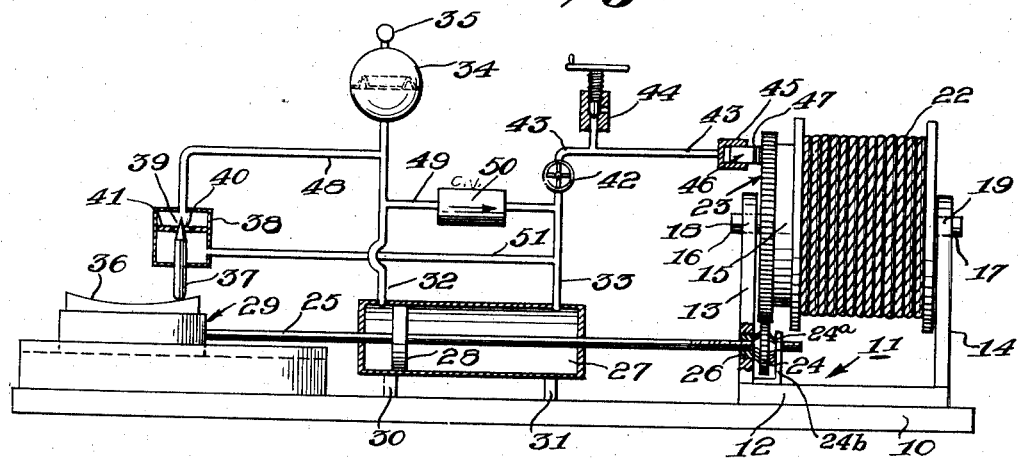
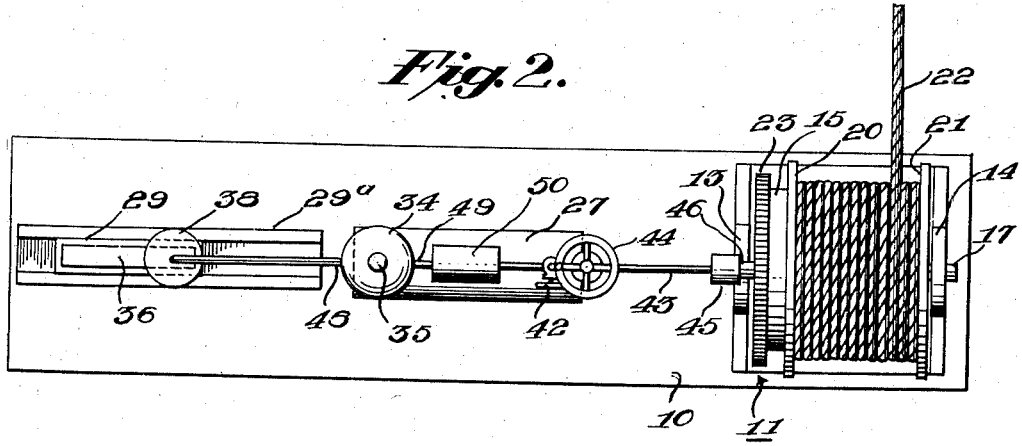
INVENTOR
Robert Burns Wysor
BY Herbert M. Birch
ATTORNEY

2,843,228

BRAKE APPLYING SYSTEMS

Robert Burns Wysor, Wilmington, Del., assignor to All American Engineering Company, Wilmington, Del., a corporation of Delaware Application January 11, 1956, Serial No. 558,461

4 Claims. (Cl. 188—180)

The present invention relates to a brake control system for fluid activated brakes and bore particularly to a fluid brake system responsive to variations in rate and displacement of the equipment being decelerated by the brake device in the system.

Broadly, it is an object of the present invention to provide a novel control system, whereby energy absorbing equipment for arresting mobile units while in action produces a constant braking runout.

An object of the device is to provide a condition responsive fluid power system for actuating brake means operatively associated with air pick-up winches, mobile object arresting gear and other means where a controlled rate of energy absorption is required.

Another object is to provide in combination with a power take-off means responsive to excessive energy conditions introduced into an energy absorber, a servomotor and a follow-up brake control adapted to apply a brake means, to thereby balance predetermined drag conditions and decelerate a mobile object producing the excessive energy conditions at the power take-off means from a connected energy absorber.

With these and other objects in view, the invention consists in the construction, arrangement and combination of parts hereinafter described and particularly pointed out in the claims, it being understood that it is not intended to limit the same to the details of construction.

In the drawings like parts throughout the several views are given like numerals and are thus identified in the following detailed description:

Figure 1 is a side elevation view with parts cut away in cross section of the assembled unit;

Figure 2 is a top plan view of the device illustrated in Figure 1.

Referring to the drawing in detail, there is disclosed one form of practical construction comprising a base 10 on which may be mounted for example, winch support 11, said support including a base 12 with uprights 13 and 14 from each end for mounting a winch or cable drum 15. The winch 15 is provided with an axle shaft at each end thereof, namely shafts 16 and 17, which are journalled to rotate in bearings 18 and 19. These bearings are of any suitable type and are not illustrated. The winch has an annular flange 20 and 21, respectively, at each end to retain a cable 22. This cable leads off into any suitable energy absorber loop or the like, not shown, which is adapted for example, to be engaged by any mobile objects to be arrested by the present novel brake controlling system.

This novel system takes off the power or energy developed by an object being decelerated when the object engages or connects with the cable 22. The cable 22 may be reeved around sheaves or the like over a ground surface in the manner well known in the art and when the cable is pulled and the winch is thus rotated this rotative energy is picked-off by means of a power take-off comprising a gear 23 formed at an end of the winch 15. This gear 23 is in mesh with a relatively smaller spur gear 24 formed with a centrally threaded opening and being turnable on a threaded shaft 25.

This screw shaft 25 is linearly movable by the rotation of the spur gear 24 and extends through a bushing 26 in the upright 13 and through a cylinder 27 into connection with a reciprocatable cam block 29. Intermediate the ends of the shaft is keyed a piston 28 which piston is confined within the pressure control cylinder 27.

Any suitable means may be provided to restrain the spur gear 24 against axial movement in order that the shaft 25 move linearly upon rotation of the spur gear, which is threadedly engaged with the shaft in the manner of a nut. Satisfactory means for this purpose may embody a hub 24a on the spur gear whose opposite ends are disposed outwardly of the opposite sides of the spur gear body and wherein one of said ends engages the referred to bushing 26 and the other end engages a vertical bracket member 24b, which is suitably secured to base 12.

The cylinder 27 is supported on cradles 30 and 31, so as to be in alignment with the power take-off connections and the cam block 29 for efficient performance. Each end of the cylinder is formed with an opening to receive the fluid lines 32 and 33, respectively. As illustrated in Figure 1, the system is provided with an accumulator 34 to maintain a predetermined constant pressure on one side of the piston 28. This pressure is indicated by the gage 35 and the amount of pressure maintained depends upon the required initial brake drag for the equipment being used, such as the winch device 15 herein illustrated or on a linear track engaging brake unit, not disclosed.

The fluid lines 32 and 33 are part of a closed fluid system, wherein the braking drag is controlled by the rate of rotation of the winch 15 and the power take-off shaft 25, which causes the cam block 29 to be linearly displaced along the grooved guide block 29a as a function thereof. This cam block is formed with convex follower surface 36 longitudinally of the linear movement path of screw shaft 25. The surface 36 engages the rounded end of a valve means, such as the tapered pin or needle 37, which is moved up or down by the cam surface 36 in the housing 38, so that the tapered end 39 of the valve 37 variably is projected into the orifice 40 formed in the orifice plate 41 in the housing. Various different forms of orifice plates may be used to alter performance characteristics of the valve, or different cam configurations.

The housing 38 connects to the fluid line 33 on one side of the piston 28 of the servomotor device, and the line 33 leads to a manual cut-off valve 42. This valve 42 may be adjusted to manually control brake drag, particularly when reverse power is applied to the winch 15 during cable retrieving, for example following an arrest operation. Also a line 43 leads to a manual relief valve 44, which is adapted to be opened when the cut-off valve 42 is closed for the retrieving operation. No retrieving motor is illustrated as this is well known in the art.

Connected to line 43 is a suitable brake cylinder 45 in which is a brake piston 46 with a projected brake shoe 47 adapted to engage the side surface of the winch 15 or the large gear 23 formed therewith.

Normally the accumulator 34 is kept pressure loaded and connects to line 32, while line 32 also connects with branch line 48 from the top of orifice valve housing 38 and branch line 49 with a check valve 50 to line 33 to the servo cylinder 27. Also, the lower portion of the valve housing 38 is formed with an opening for the fluid line 51 connected to the line 33 adjacent and above its connection to the pressure control cylinder 27 of the servomotor.

*Operation*

The operation of the system is believed to be generally apparent from the foregoing description, for example, to briefly summarize the same the cable 22 may be reeved out around sheaves or the like in a loop formation, not shown, adapted to be engaged by the usual arrest hook of an aircraft. When the aircraft as it lands picks up the loop the deceleration of the aircraft thereby causes the cable to unwind and rotate the drum or winch 15 with the gear 23. This imparts rotation to the power take-off spur gear 24 and causes the pressure control cylinder 27 to function by moving the piston rod 25, to thereby pull the piston 28 forward to force fluid through the orifice 40 of plate 41. As the piston rod 25 is moved the extent of the piston movement is responsive to the velocity and displacement of the cable 22, and the cam 29, which is connected to the end of the piston rod 25, also moves along the guide to thereby open the valve 39 wider and permit more fluid to transfer through the line 48 to the left side of the cylinder 27. In view of the reduced resistance of fluid transfer through the valve the rate of braking action would be decreased.

Thus there is provided a brake control system, which is sensitive to the velocity and displacement of the equipment being braked and also an arrangement is provided, whereby the operative conditions may be varied by interchanging the cam 29 or the orifice plate 41 with others of different formations.

While only one specific embodiment of the invention is hereinbefore set forth, it is to be expressly understood that the same is not to be limited to the details or construction and arrangement of the parts as illustrated and described because various modifications may be developed in putting the invention into practice within the scope of the appended claims.

What is claimed is:

1. In combination, energy absorbing equipment including a brake and means for applying said brake to control the said energy absorbing equipment, said means comprising a cylinder having a first and second chamber, a piston including a rod in said cylinder, said piston rod operatively connected to the energy absorbing equipment through a power take-off means sensitive to the rate of movement of said energy absorbing equipment, a valve, a fluid line connecting said first chamber to said brake, said valve connecting said first chamber to said second chamber, and means connecting said valve to said piston rod for controlling said valve in proportion to the rate of movement of said energy absorbing equipment to regulate the application of said brake.

2. In combination, energy absorbing equipment including a brake and means for applying said brake to control the said energy absorbing equipment, said means comprising a double-acting fluid motor including an actuator, said fluid motor having a first and second chamber, said actuator being operatively connected to said energy absorbing equipment through a power take-off means sensitive to the rate of movement of said energy absorbing equipment, fluid pressure control means for by-passing fluid pressure from one chamber of said fluid motor to the other chamber, said brake being connected to one chamber of said motor, said fluid pressure means being connected to said actuator, and means operated by said actuator for controlling said fluid pressure control means in proportion to the rate of movement of said energy absorbing equipment to regulate the application of said brake.

3. The combination as described in claim 2, wherein the last named means includes a cam.

4. The combination as described in claim 3, wherein said energy absorbing equipment includes a rotatable drum and cable.

References Cited in the file of this patent

UNITED STATES PATENTS

| | | |
|---|---|---|
| 1,004,430 | Hoslet et al. | Sept. 26, 1911 |
| 1,242,103 | Hunter | Oct. 2, 1917 |
| 2,609,157 | Asmussen et al. | Sept. 2, 1952 |

FOREIGN PATENTS

| | | |
|---|---|---|
| 1,029,092 | France | Mar. 4, 1953 |